(12) United States Patent
Janetis et al.

(10) Patent No.: US 7,825,794 B2
(45) Date of Patent: Nov. 2, 2010

(54) ALZHEIMER'S PATIENT TRACKING SYSTEM

(75) Inventors: Elias M. Janetis, Boynton Beach, FL (US); Ernest F. Pasanen, Long Valley, NJ (US)

(73) Assignee: Integrity Tracking, LLC, Boca Raton, FL (US)

( * ) Notice: Subject to any disclaimer, the term of this patent is extended or adjusted under 35 U.S.C. 154(b) by 472 days.

(21) Appl. No.: 11/891,377

(22) Filed: Aug. 10, 2007

(65) Prior Publication Data

US 2009/0040041 A1 Feb. 12, 2009

(51) Int. Cl.
G08B 1/00 (2006.01)
G08B 1/08 (2006.01)
G08B 13/14 (2006.01)
G08B 23/00 (2006.01)
G08G 1/123 (2006.01)
H04W 24/00 (2009.01)

(52) U.S. Cl. .................... 340/539.13; 340/539.2; 340/572.1; 340/573.1; 340/995.1; 455/456.1; 455/456.2; 455/456.3; 455/456.4; 455/456.6; 455/457

(58) Field of Classification Search ............ 340/539.13, 340/539.2, 572.1, 573.1, 995.1; 455/456.1–456.6, 455/457
See application file for complete search history.

(56) References Cited

U.S. PATENT DOCUMENTS

| | | | |
|---|---|---|---|
| 4,593,273 A | 6/1986 | Narcisse | |
| 4,598,275 A | 7/1986 | Ross et al. | |
| 4,814,751 A | 3/1989 | Hawkins et al. | |
| 4,884,060 A | 11/1989 | Shapiro | |
| 5,919,239 A | 7/1999 | Fraker et al. | |
| 6,121,922 A | 9/2000 | Mohan | |
| 6,198,390 B1 | 3/2001 | Schlager et al. | |
| 6,339,397 B1 | 1/2002 | Baker | |
| 6,441,778 B1 | 8/2002 | Durst et al. | |
| 6,518,919 B1 | 2/2003 | Durst et al. | |
| 6,544,171 B2 | 4/2003 | Beetz et al. | |
| 6,590,525 B2 | 7/2003 | Yule et al. | |
| 6,661,372 B1 | 12/2003 | Girerd et al. | |
| 6,700,533 B1 | 3/2004 | Werb et al. | |
| 6,741,188 B1 * | 5/2004 | Miller et al. | 340/995.1 |
| 6,774,797 B2 * | 8/2004 | Freathy et al. | 340/573.1 |

(Continued)

OTHER PUBLICATIONS

Newspaper Article—Star-Gazette—Sunday, Aug. 19, 2007—"Tracking the Lost".

*Primary Examiner*—Benjamin C Lee
*Assistant Examiner*—Lam P Pham (57) ABSTRACT

The computerized system provides a method to track Alzheimer's patients and other diseases that affect the patient's ability to contact and communicate their location or vital information to their caregivers. The system applies an electronic tag to each patient of a multiplicity of patients or only to non-confined patients and employs a computer to maintain information about their location and well being. Use is made of a global positioning system to locate a lost patient as well as to track movements of the patient. A history of the movement of the patient may also be plotted on a map. Additional components of the tag gather and relay information about the patient's condition and other environmental data. In addition, the use of a an additional external transmitter keeps the wearable tag in a low power "sleep" mode when it is in range, preserving the internal battery and only consuming power when the tag moves out of range of the external transmitter.

13 Claims, 11 Drawing Sheets

U.S. PATENT DOCUMENTS

| | | |
|---|---|---|
| 6,859,171 B2 | 2/2005 | Durst et al. |
| 6,998,985 B2 * | 2/2006 | Reisman et al. .......... 340/573.1 |
| 7,038,590 B2 | 5/2006 | Hoffman et al. |
| 7,123,141 B2 | 10/2006 | Contestabile |
| 7,123,153 B2 * | 10/2006 | Thorstensen et al. ...... 340/573.3 |
| 7,138,916 B2 | 11/2006 | Schwartz et al. |
| 7,155,238 B2 * | 12/2006 | Katz ...................... 455/456.1 |
| 7,233,783 B2 | 6/2007 | Usui |
| 7,251,471 B2 | 7/2007 | Boling et al. |
| 7,349,705 B1 | 3/2008 | Holland |
| 7,366,522 B2 * | 4/2008 | Thomas .................. 455/456.1 |
| 7,420,472 B2 * | 9/2008 | Tran ........................ 340/573.1 |
| 7,538,674 B2 * | 5/2009 | Garfinkle ................. 340/572.1 |
| 7,545,318 B2 | 6/2009 | Derrick et al. |
| 7,564,405 B2 | 7/2009 | Durst et al. |
| 2002/0070881 A1 | 6/2002 | Marcarelli et al. |
| 2002/0145559 A1 | 10/2002 | Sullivan |
| 2007/0030156 A1 | 2/2007 | Schlager et al. |
| 2007/0247359 A1 | 10/2007 | Ghazarian |
| 2008/0074265 A1 * | 3/2008 | Schoen et al. ............ 340/572.1 |
| 2008/0246656 A1 | 10/2008 | Ghazarian |
| 2008/0311882 A1 | 12/2008 | Schlager et al. |

* cited by examiner

ALZHEIMER'S PATIENT TRACKING SYSTEM

BACKGROUND OF THE INVENTION

1. Field of the Invention

This invention relates to a computerized Alzheimer's patient tracking system and the method used to track and locate a missing patient. The system employs the use of the Global Positioning System (GPS), the Internet, a unique software interface, a unique application software and unique tracking device firmware.

2. Description of the Prior Art

A variety of prior art systems have been proposed for the tracking of patients or other objects. Examples of some of such devices and systems are described below.

Hawkins et al., U.S. Pat. No. 4,814,751 sets off an alarm when the signal strength of a transmitted signal falls below a predetermined level. Narcisse, U.S. Pat. No. 4,593,273 provides a similar out of range alarm system. These patients deal with a simple strap on transmitter. In that regard, these devices are more akin to the traditional house arrest system that transmits periodically to a fixed receiver. In this case, instead of an autodialer, it sounds and audible alarm. The present invention, by contrast, incorporates both a receiver and transmitter that can communicate with multiple base stations. This allows the unit itself to communicate in both directions, and in conjunction with other Zibee devices, can be used to track the unit without used of the GPS or transmitter.

Ross et al., U.S. Pat. No. 4,598,275 discloses a movement monitoring system having a wrist band 22 including a receiver 30, a battery and switch 32 and a transmitter 34. The receiver is continuously activated and the transmitter is normally deactivated unless activated by the receiver in response to a signal from a detector. This patent specifically identifies the problems of bulky batteries and of the need to recharge such a device if it is left in transmit mode all of time.

Beetz et al, U.S. Pat. No. 6,544,171 discloses a system for patient monitoring which includes a body sensor for measuring a physiological parameter. This devise utilizes a cellular mobile radiotelephone system for tracking purposes. The unit in this patient uses a dedicated sensor. Our unit uses a Bluetooth transceiver to communicate with multiple remote devices. These devices can measure many metrics and can communicate with other common Bluetooth devices.

Baker, U.S. Pat. No. 6,339,397 discloses a self contained tracking unit and GPS tracking system. This device utilizes solar power to address power consumption issues.

Werb et al., U.S. Pat. No. 6,700,533 discloses an asset and personnel tagging system utilizing GPS. Werb et al. primarily use a local area LAN, like WiFi, or RFID, to relay GPS data to a server. The present invention, by contrast, uses RFID to keep the unit off until needed, and do not use it to transmit GPS data. When in a building, in proximity to RFID, the present invention will use the ID of the unit to track the patient, and not the GPS, which is less effective indoors, and would draw power uselessly. Further, to use the Werb device, a mobile unit needs to be deployed in the area the tag is to be used and illustrates a truck being used on a construction yard, and RFID relaying GPS data to it.

Schwartz et al., U.S. Pat. No. 7,138,916 (which was co-invented by one of the co-inventors of the present application), discloses a computerized system which provides a method to inventory articles, to locate lost or stolen articles and to recover a lost or stolen article. The system applies an electronic tag to each article of a multiplicity of articles or only to a valuable article and employs a computer to maintain an inventory of all articles. Use is made of a global positioning system to locate a lost or stolen article as well as to track movements of the article. A history of the movement of the article may also be plotted on a map. An electronic geographic boundary area may also be placed around an article that can be used to emit a signal indicative of the article leaving the area. This patent is used for asset tracking and its programming was unique, setting it apart from other devices of this type. The present invention will be based on this core programming, but will evolve it so that the device can re-program itself depending on traffic from the Bluetooth or Zigbee. The specification of Schwartz et al., U.S. Pat. No. 7,138,916 is hereby incorporated herein by reference thereto.

The problems associated with the increasing number of people afflicted with Alzheimer's syndrome and other related diseases can not be overstated. With the increasing percentage of the population now over 55 years of age, there is a proportional incidence of people suffering from Alzheimer's and other illnesses that weaken and eventually destroy their cognitive ability.

In the past, there have been many attempts to monitor the location of individuals. Children and the elderly are in the most obvious need for such tracking, but other individuals, such as people under house arrest have also received tracking tags of various types.

There are obvious disadvantages and drawbacks to wearable tracking devices to date. The two types of locator tags currently available are: A simple transmitting tag. This type of device has been used by law enforcement for many years. A simple transmitting tag is placed on the wrist or the ankle of the individual being monitored, and a receiver is placed in their home or residence. The receiver is powered from a wall outlet (usually with a battery backup) and is connected to the home phone, or in more recent versions of these tags, to a cell phone network.

The principal of operation is quite simple. When the wearable tag moved out of range of the receiver, a microprocessor in the receiver will automatically dial a pre-programmed phone number. A central receiving station receives the call, and notes the time of the alert.

There are advantages of this system. The power requirement for the wearable tag is small. These are typically small transmitters with a limited range, powered on for a fraction of a second every minute or two. This limits the power consumption of the tag, allowing it run on a small battery for a prolonged period of time. The receiver is powered by wall power or the phone circuit, and has no power consumption issues. In addition, the system is relatively inexpensive, requiring a simpler autodial circuit that contacts a central service. The only cost associated on a recurring basis is that of a call center. But there are disadvantages. The information delivered to the call center is limited to the time the individual left a known location. Though this information is useful, it must be acted upon immediately in order to find the individual before they move too far away from the receiving unit.

The second type of tag is the GPS based radio tag. This is a wearable tag consisting of a GPS receiver, a radio that operates on a public communications network, and a microprocessor to control the radio and extract data from the GPS. These systems usually strap to a persons wrist or ankle, and is designed to deliver the individual's location in real time to a central server.

The advantages of this system are obvious, but there are daunting problems. Existing tags tend to be large, and the primary reason for this is due to the power requirements of the radio, GPS and support circuitry.

To work properly and deliver location data in as close to real time as possible, the tag radio and GPS must be fully active. As with any radio transmitter, anytime the unit transmits it draws considerable power from its battery. This will limit the useful period of time the tag can be used before battery replacement or recharging from 3 hours to 24 hours, depending on the frequency of transmission.

Most tag systems are rechargeable, and so require the unit to be removed and recharged, usually once a day. This is a huge problem in most human or animal tracking applications, but is nearly impossible to implement with Alzheimer's patients.

Unless a caregiver is available to maintain the device on a daily basis, its battery will run down and become useless when needed to locate the patient. Some tags use a "panic button", which keeps the unit off until it is manually activated by the wearer. This resolves the battery problem, but requires the wearer to activate the tag while under duress. Once again, in the case of Alzheimer's patients (and children), this is not a viable solution.

SUMMARY OF THE INVENTION

The tracking system of the present invention blends the advantages of both types of existing tags, and in addition adds the additional functionality provided by Bluetooth and RFID components incorporated into it.

The tracking system of the present invention can be programmed in a wide variety of ways. In its basic configuration, the unit maintains itself in a low power mode while it is in proximity to a transmitter located in a residence, home, or on a caregiver's person (typically a keyfob). As long as the tag is in range of these, the unit remains off, or will only come on periodically. Only when the unit moves out of range, will it switch to full power mode, and begin transmitting the patients location.

Unlike the old style "house arrest" tag, the device returns the full location of the patient for as long as the unit battery has power. This means that this tag can go for long periods without charging. Depending on the size of the battery and the default mode of the unit, the tag can potentially remain active between charging for several weeks.

The present invention in its simplest form provides a tracking system process for locating an individual comprising the steps of: a) affixing a wearable electronic first tag to the individual, said first tag including a wireless transceiver for communication over a public communications network, a GPS receiver for receiving location related information from a global positioning system, a microprocessor for performing on board calculations and transferring data from said GPS receiver to said transceiver, and firmware in said microprocessor for processing instructions for operation of said transceiver, said GPS receiver and said microprocessor communicating with the communications network; b) delivering an electronic signal from a remote location via a global positioning system to said transceiver on the article to activate said first tag to receive location related information from the global positioning system and to emit a location signal directly from said GPS receiver indicative of the location of the article to said remote location; and c) providing a FLASH memory within said electronic tag for tracking the location of the article over a period of time and delivering corresponding information from said firmware to said remote location to display the path of travel of the article over time on a map at said remote location.

In one embodiment of the invention an additional module is incorporated into said first tag that communicates to other commercially available devices using the industry standard Bluetooth standard protocol. An additional internal transmitter and receiver may also be incorporated into the said first tag which includes an industry standard RFID Zigbee protocol module with incorporated microprocessor. A second tag may also be provided, which works in concert with said first tag, and wherein said second tag contains only an industry standard RFID Zigbee module with incorporated microprocessor.

In one embodiment of the invention the first tag is suppressed from transmitting its coordinates when in range of the second RFID Zigbee tag, the purpose of which is to greatly extend the battery life of the said first tag by placing it in a low power mode when in range of the second tag, and wherein when the said tag is physically moved out of a predetermined range of the secondary tag, the first tag switches into a full power mode, and begins transmitting the GPS coordinates of the individual over the wireless network.

A custom firmware package may also be incorporated into the FLASH memory of the said first tag that will gather information from its integral Bluetooth device from other commercial devices that can measure at least one of heart-rate, body temperature, and other remote sensing devices, which information is processed by the said tag and sent via the wireless network. Custom firmware may also be incorporated into the FLASH memory of the RFID Zigbee module to permits it to interact with other commercial Zigbee devices mounted within a building to allow tracking of individuals at low cost without using a public wireless communications network.

In one embodiment of the invention the public Internet is utilized for collecting data from at least one of the public wireless network and in-building RFID systems and preserves data collected from the GPS system and by the Bluetooth module by a software system that preserves the data in a database and permits viewing the individual's current location and other vital data via a web-based application that permits caregivers the ability to directly access this data by at least one of the public Internet and via telephone to a human operated call center. An alert system may be incorporated that notifies caregivers of at least one of activation of the said tag and of actionable information from the interfaces in the form of email, pager messages or SMS message via a cell phone carried by the caregiver. Further, commands from said software system may be issued to the said first tag to cause it to transmit immediately, or to change the frequency and content of the first tag data.

In one embodiment of the invention firmware is used to transfer location data from the GPS receiver, and telemetry from the BlueTooth module, and wherein said tracking process uses an algorithm to move this data over the local RFID (Zigbee) network, or via terrestrial radio. To maintain battery power over a long period of time, a combination of various hardware power switches, power monitoring circuitry and firmware may switch power to the terrestrial radio, Bluetooth module, RFID and GPS receiver to reduce overall power consumption. Other components of the firmware provide the ability to track the first tag within a building using only the RFID Zigbee network.

DETAILED DESCRIPTION OF THE PREFERRED EMBODIMENTS

The present invention is specifically designed to locate an individual who suffers from Alzheimer's patients and other diseases that affect the patient's ability to contact and communicate their location or vital information to their caregivers. However, as will be obvious to those of skill in the art, the present invention may also be effectively utilized for locating and tracking pets or other animals, or even inanimate objects. Accordingly, the term "individual" as used in this application is intended to be broadly defined to include any one of a human, an animal and an inanimate object.

Referring to the figures, a tracking system 2 is for locating an individual 4 suffering with Alzheimer's syndrome or other illness impairing their ability to seek help on their own. A wearable electronic tag 10 is affixed to the individual 4. The tag 10 includes a wireless transceiver 20 for communication over a public communications network 30, a GPS receiver 40 for receiving location related information 50 from a global positioning system 60, a microprocessor 70 for performing on board calculations and transferring data 80 from said GPS receiver 40 to said transceiver 20 and firmware 90 in said microprocessor 70 for processing instructions for operation of said transceiver 20. The GPS receiver 40 and the microprocessor 70 are utilized for communicating with the communications network 30 and deliver an electronic signal 100 from a remote location 120 via a global positioning system 60 to said transceiver 20 on the article 6 to activate said tag 10 to receive location related information 130 from the global positioning system 60 and to emit a location signal 140' directly from said GPS receiver 40 indicative of the location 140 of the article 6 and the individual 4 to said remote location 120. FLASH memory 150 is provided within said electronic tag 10 for tracking the location 140 of the article 6 and the individual 4 over a period of time and delivering corresponding information 142 from said firmware 90 to said remote location 120 to display the path of travel of the article 6 over time on a map 160 at said remote location 120.

Figure 3:
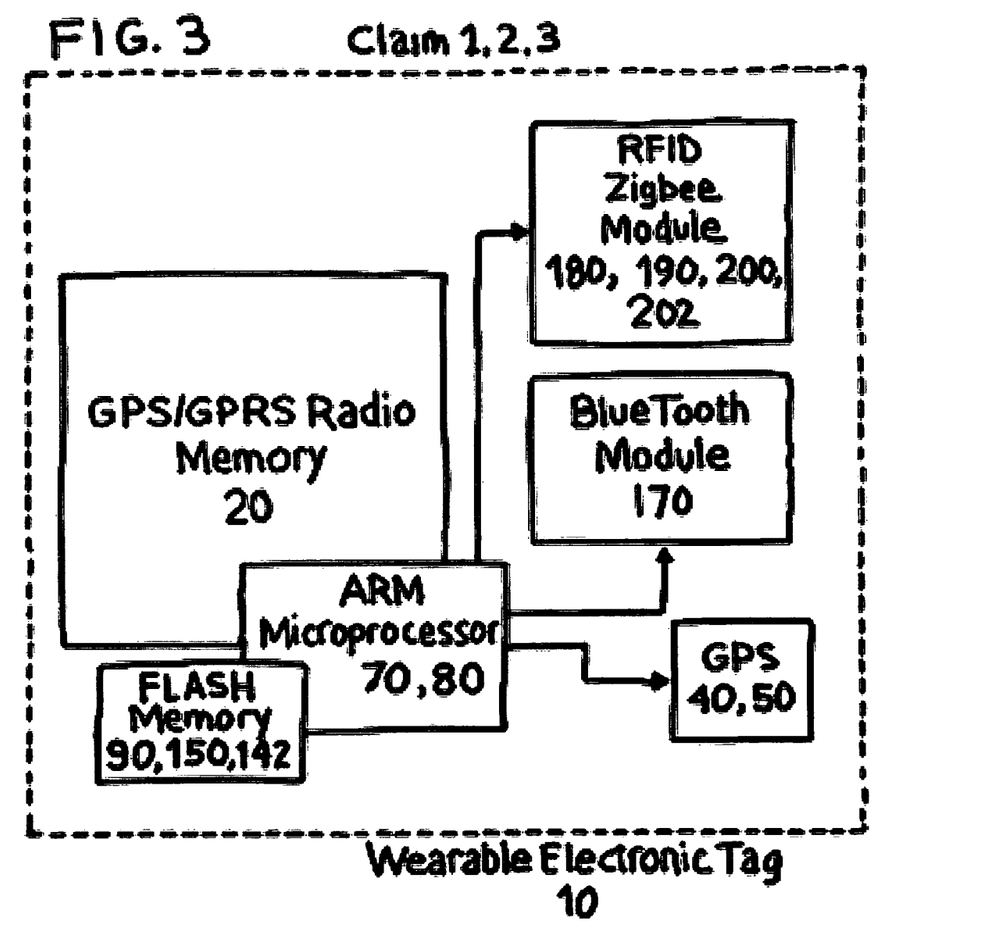
FIG. 3 is a diagrammatic figure showing the various components of the wearable electronic tag.
Figure 4:
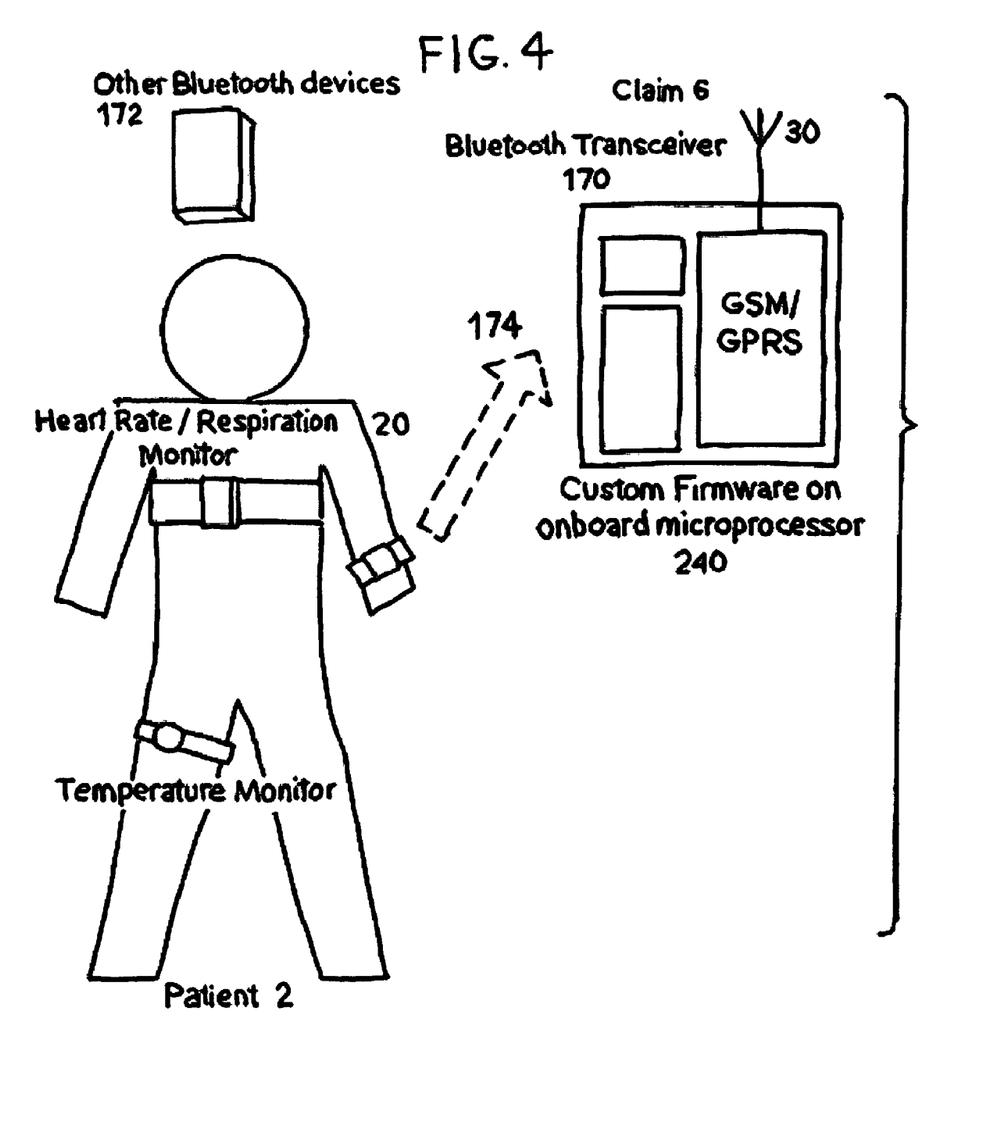
FIG. 4 is a diagrammatic figure which show and individual wearing a heart rate and respiration monitor and a temperature monitor in addition to the wearable electronic tag.
Figure 5:
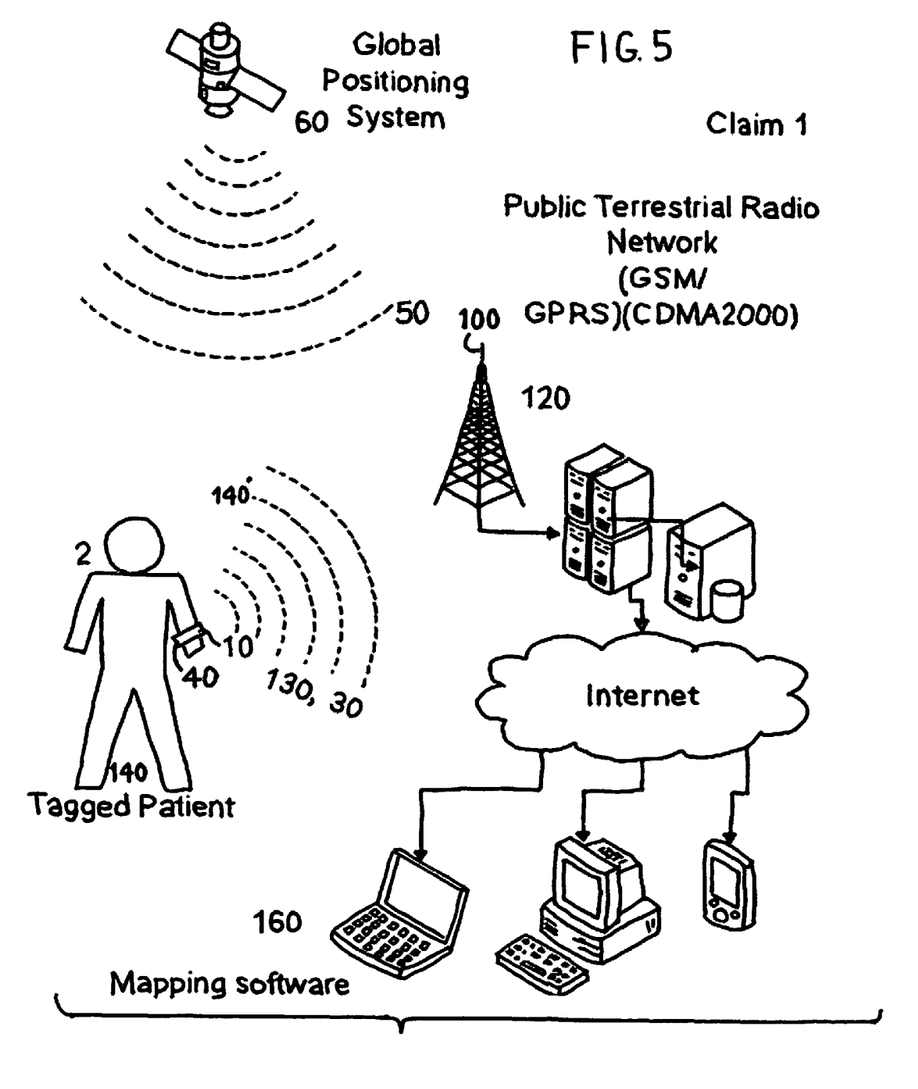
FIG. 5 is a diagrammatic figure showing the interrelationship of the various components of the present invention.

Referring to FIGS. 3 and 4, one an additional module 170 is preferably incorporated into said tag 10 that communicates to other commercially available devices 172 using the industry standard Bluetooth standard protocol.

Preferably, as shown in FIG. 3, an additional internal transmitter 180 and receiver 190 are incorporated into the said tag 10 which includes an industry standard RFID Zigbee protocol module 200 with incorporated microprocessor 202.

Figure 1:
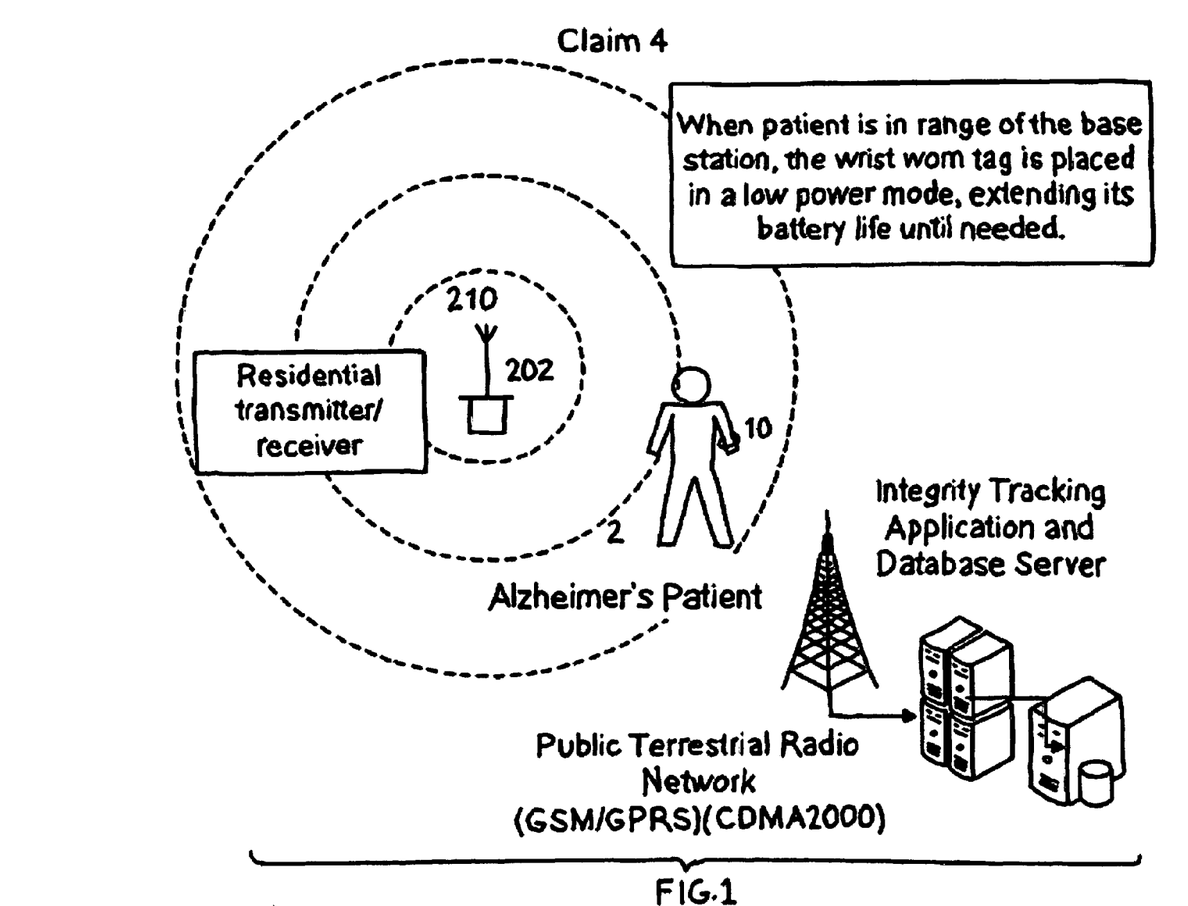
FIG. 1 is a diagrammatic figure showing a patient in range of a base station with a wrist worn tag placed in a low power mode extending its battery life until needed.

In one embodiment of the present invention, as shown in FIG. 1, a second tag 210 working in concert with said aforementioned tag 10 contains only an industry standard RFID Zigbee module 200 with incorporated microprocessor 202.

Figure 2:
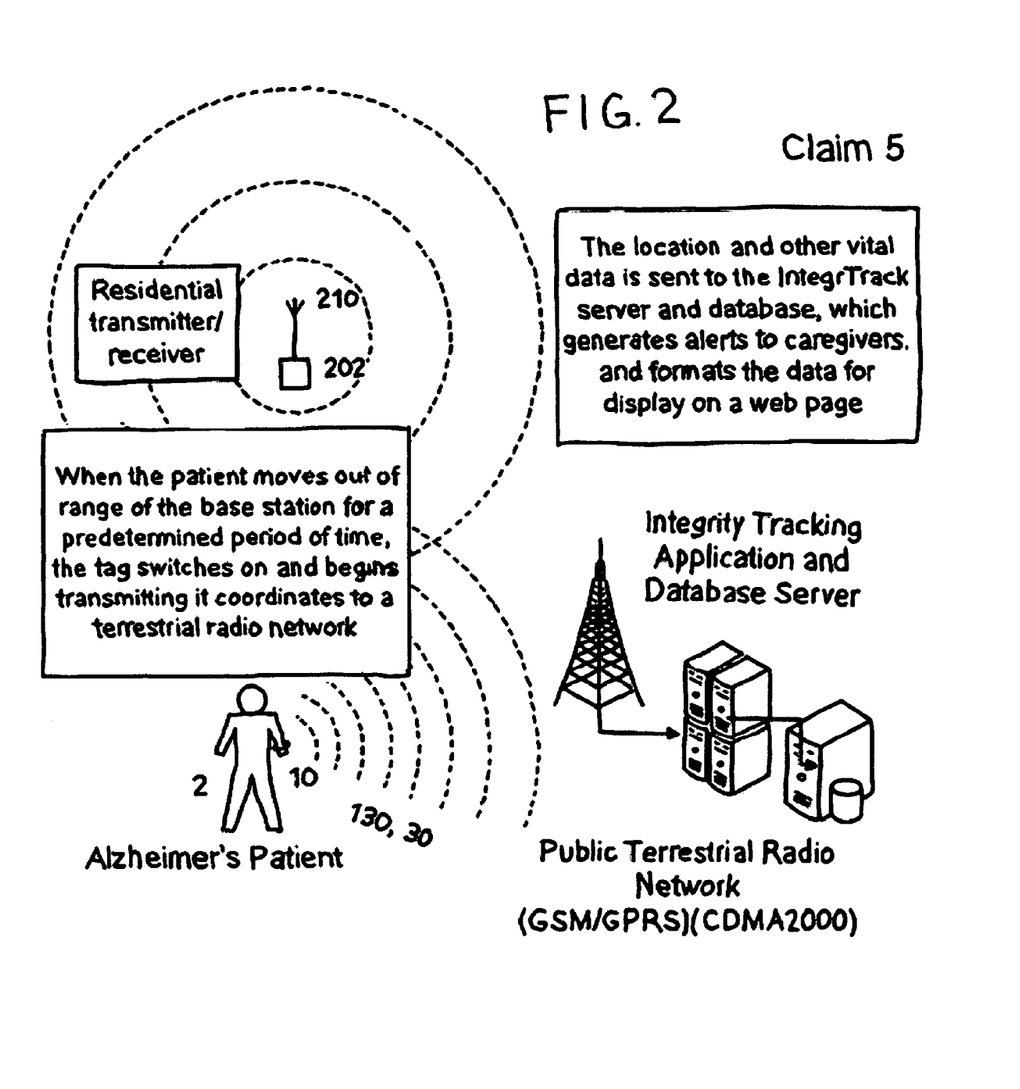
FIG. 2 is a diagrammatic figure showing a patient who has moved out of range of a base station for a predetermined period of time with the tag switched on to transmit its coordinates to a terrestrial radio network and to a server and database which generates alerts to caregivers and formats the data for display on a web page.

In the embodiment of the invention as shown in FIG. 2, tag 10 is placed in a low power mode when in range of the second tag 210 to suppress the first tag 10 from transmitting its coordinates 130 when in range of the second RFID Zigbee tag 210 the purpose of which is to greatly extend the battery life of the said first tag 10. When the said tag 10 is physically moved out of a predetermined range of the secondary tag 210, it switches into a full power mode, and begins transmitting the GPS coordinates 130 of the individual 2 over the wireless network 30.

Figure 6:
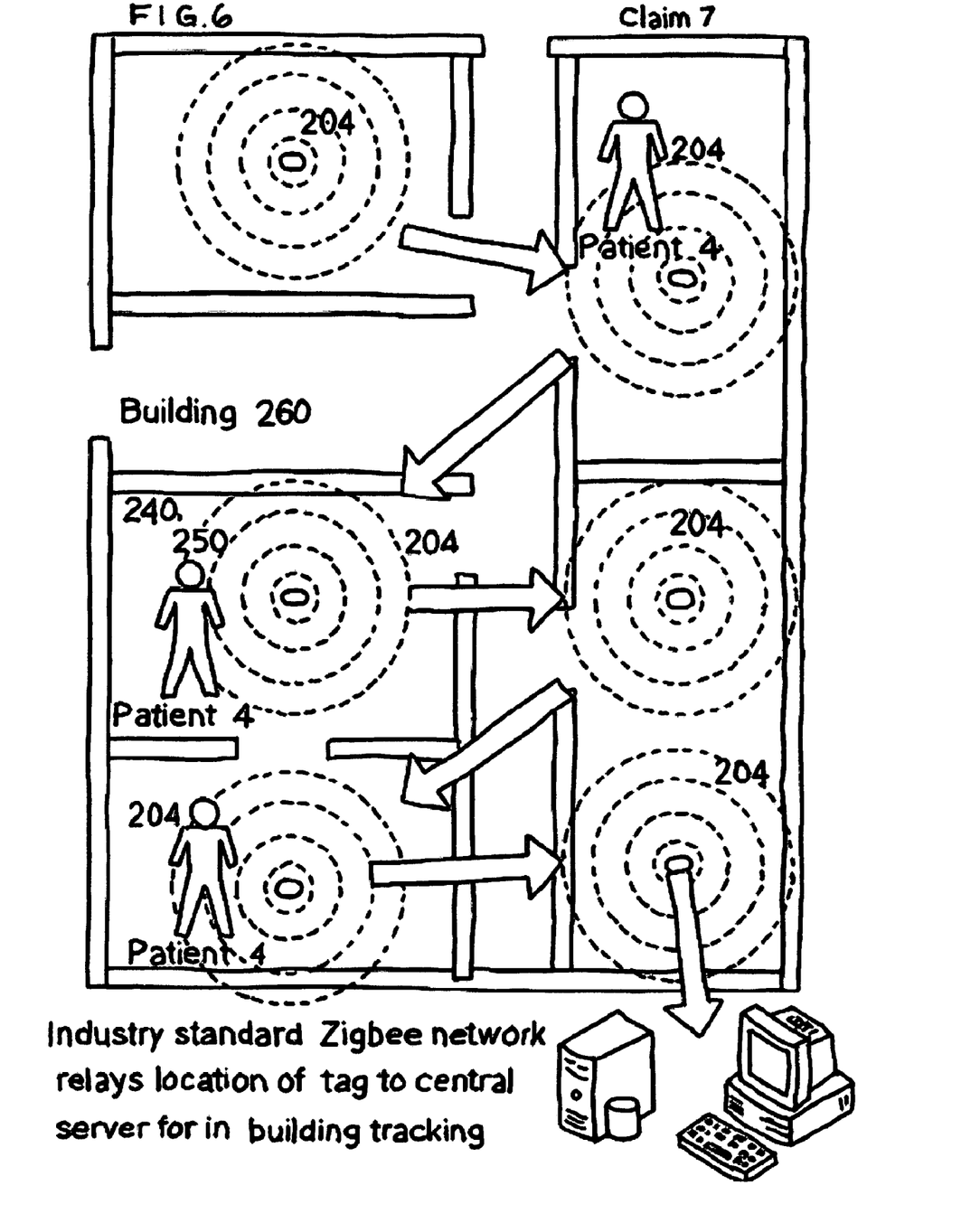
FIG. 6 is a diagrammatic figure showing the tracking of an individual through multiple within rooms of a building with an industry standard Zigbee network relaying the individual's location to a central server.

In an embodiment of the invention as shown in FIG. 4, a custom firmware package 240 is incorporated into the FLASH memory 150 of the said tag 20 that will gather information 174 from its integral Bluetooth device 170 from other commercial devices 172 that can measure heart-rate, body temperature, and other remote sensing devices 250 (FIG. 6). This data 174 will be processed by the said tag 10 and sent via the wireless network 30.

Figure 7:
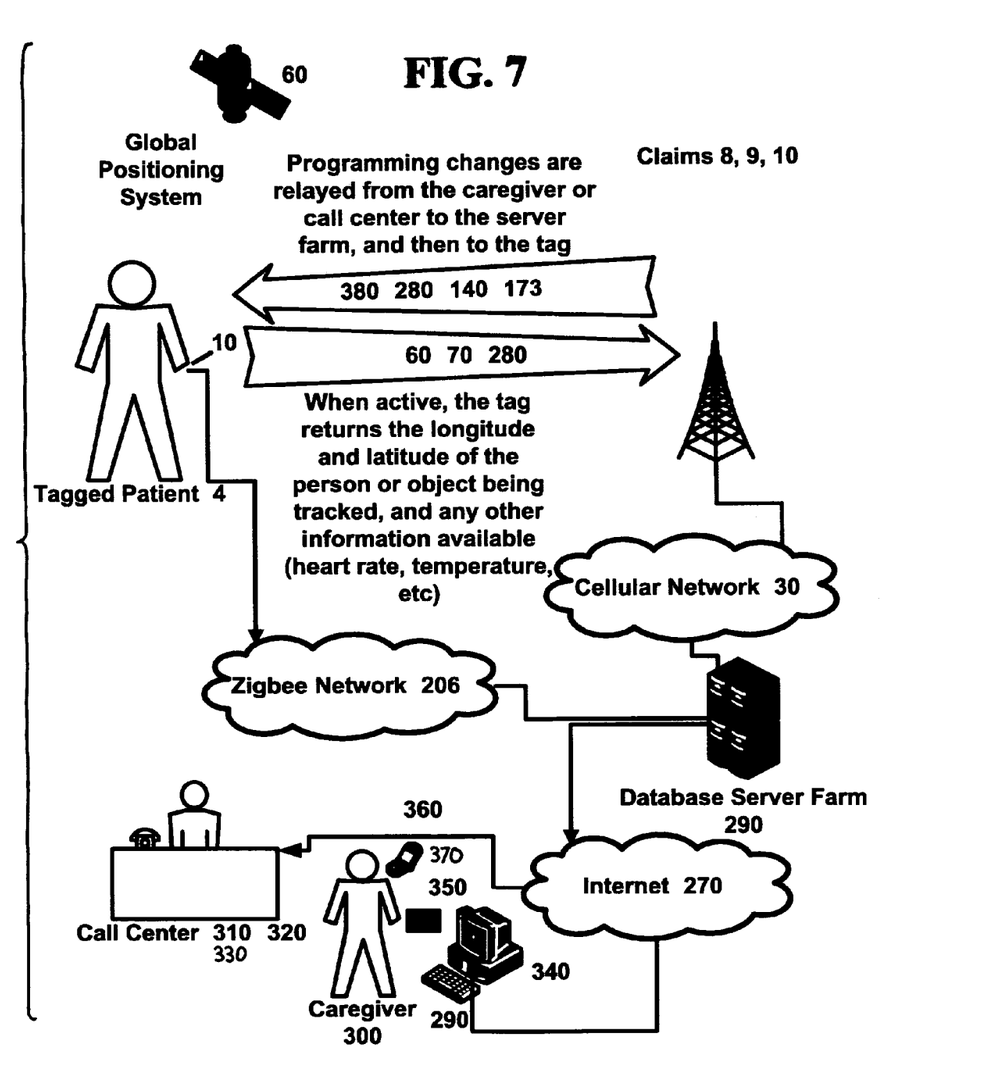
FIG. 7 is a diagrammatic figure showing the interrelationship of various components of the present invention.

In an embodiment of the invention shown in FIG. 7, custom firmware 240 is incorporated into the FLASH memory 250 of the RFID Zigbee module 200 which permits it to interact with other commercial Zigbee devices 204 mounted within a building 260 to allow tracking of individuals 4 at low cost without using a public wireless communications network. The custom firmware 240 can be summarized as follows as is shown in the flow chart of FIG. 10.

Figure 10:
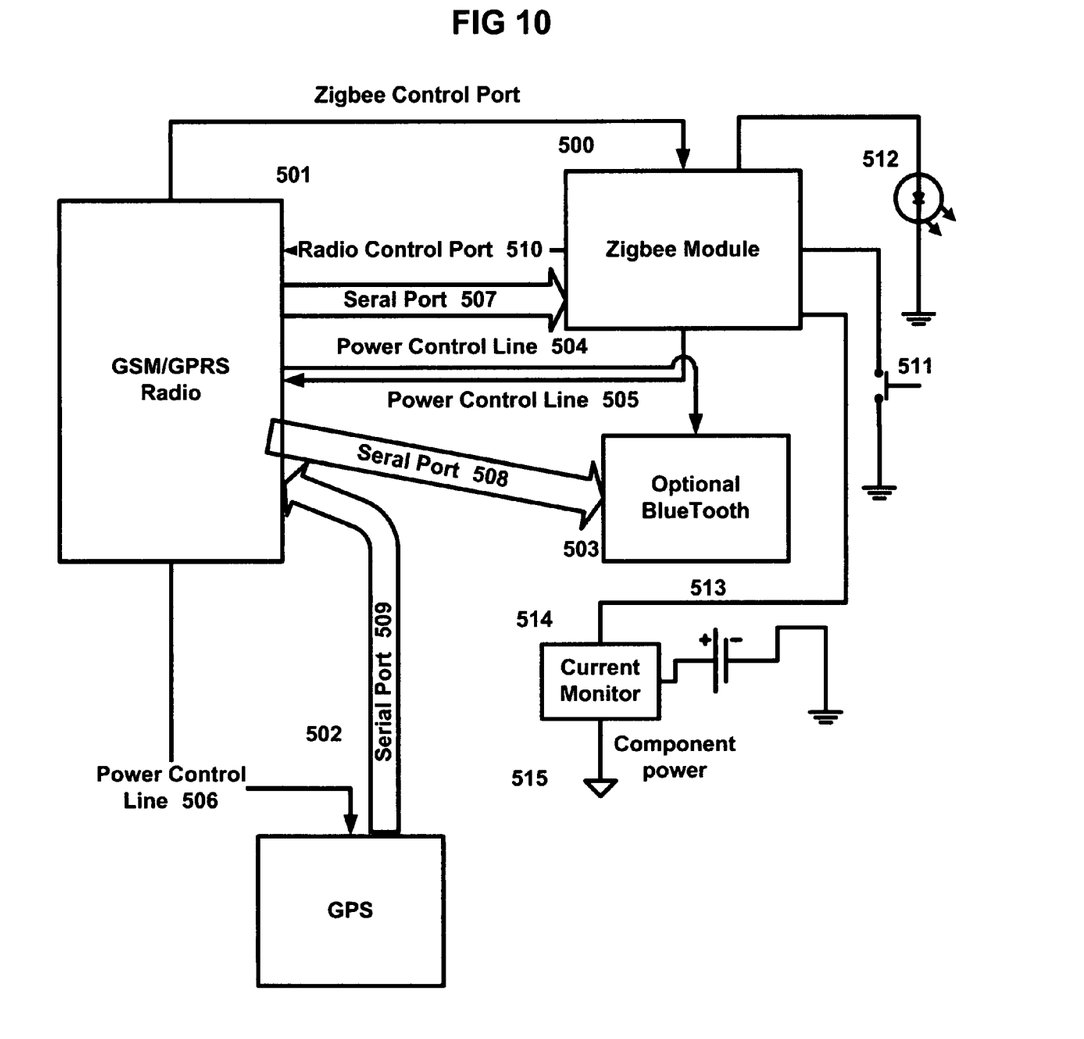
FIG. 10 is a diagrammatic figure showing a flow chart of the firmware of the present invention.

In the simplified block diagram FIG. 10, the onboard processor in the Zigbee RFID 500 device periodically checks for the existence of a home tag, or on carried by a caregiver in a keyfob. When in range of this device, the Zigbee keeps the primary radio 501 and GPS 502 in a low current "standby", and then switches itself into a low power sleep mode of predetermined duration. When the unit "wakes" again, it takes the following actions.

The Zigbee turns on the wireless transceiver using the power control line 504. The transceiver connects its network and queries it for incoming requests. If incoming requests are found, the radio uses the serial port 507 to reprogram the Zigbee processor. The Zigbee module meanwhile checks for the presence of its companion transceiver. If the transceiver is not found in a predetermined period of time, the module signals the radio that resides on the public network 510 to begin transmitting its location at a predetermined interval. The radio on the public network first determines its location via simple transmitter triangulation, and then powers on 506 and resolves this further with data from the integral GPS 502. The radio then powers up 505 and then queries the optional Bluetooth 503 device to determine if any additional data is available for transmission. If any data has been queued through the public network destined for the tacking device, this information is acted on 507. This data may cause an immediate transmission, a query to a Bluetooth device, or reprogramming of the intervals in which the unit responds. In addition, a "panic" button 511 is included in the design to immediately wake the unit, and perform a preprogrammed task. Battery power is monitored 514, and an LED 512 is flashed and a transmitted notification is sent if the battery is low. Once all functions are completed, the unit will go back to sleep until its internal clock wakes it once again.

Referring now to FIG. 7, a tracking system that resides on the public Internet 270 is used for collecting data from the public wireless network 30 or from in-building RFID systems 206 and preserves data collected from the GPS system 60 and by the Bluetooth module 170 by a software system (IntegraTrack) 280 that preserves the data in a database 290 and permits viewing the patients 4 current location 140 and other vital data 173 via a web-based application 290 that permits caregivers 300 the ability to directly access this data 140, 173 or over the public Internet 270 or by via telephone 310 to a human operated call center 320. An alert system 330 can be provided that notifies caregivers 300 of activation of the said tag 10 or of actionable information from the interfaces in the form of email 340, pager messages 350 or SMS message 360 via a cell phone 370 carried by the caregiver 300. The tracking system can issue commands 380 from the IntegraTrack system 280 to the said tag 10 to cause it to transmit immediately, or to change the frequency and content of the tag data 140, 173. The IntegraTrack software system 280 can be summarized as follows as is shown in the flow chart of FIG. 9.

Figure 9A:
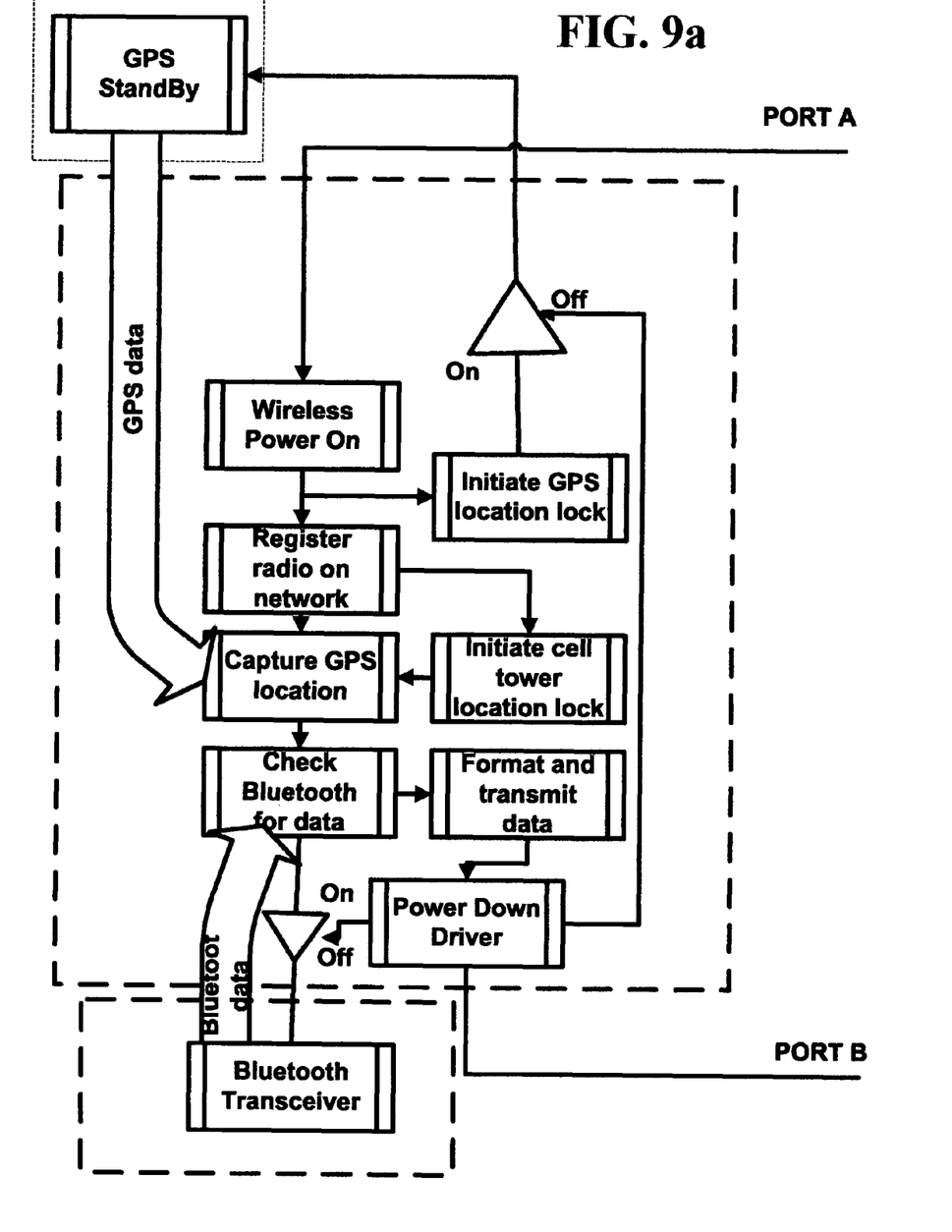
FIGS. 9a and 9b each show a portion of a diagrammatic figure showing a flow chart of the software system (IntegraTrack) utilized with the present invention.
Figure 9B:
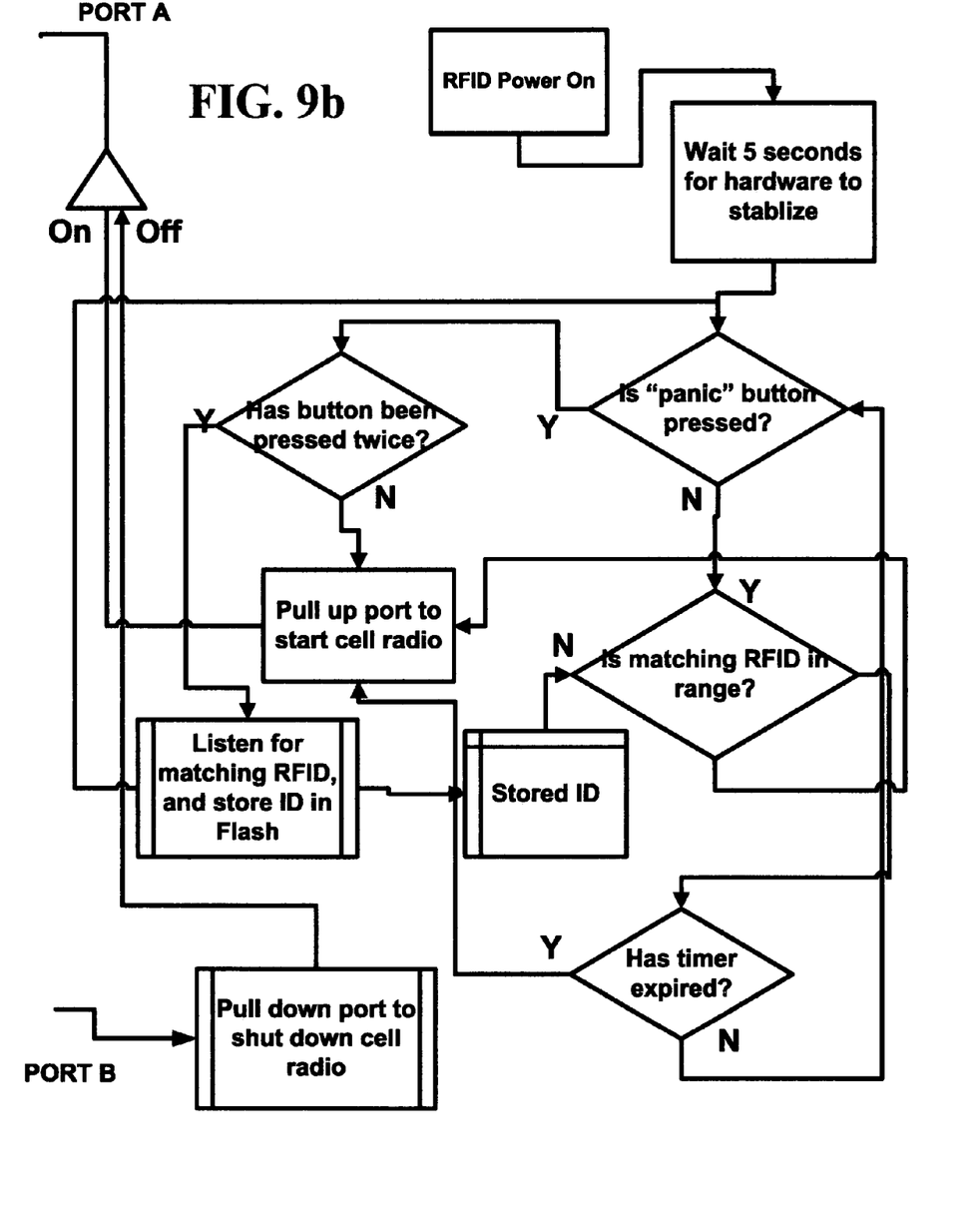

On power up application 400, the unit will perform various operations to initialize its internal clocks and load preprogrammed parameters 401. The Zigbee will wake the radio on the public network. The radio will utilize its own internal processor 412, connect to the public network 414. The radio will check for received re-programming data 420, and will load this new software to the Zigbee and restart it. Otherwise, the unit and get its current location, first from triangulation 415 from the public network system, and then from the GPS 411, 416. It will check for data on the optional Bluetooth device 417, 420 then broadcast this data 418, and then signal the Zigbee processor that it has completed its initialization 419. The Zigbee unit will then check the status of the "panic" button 402. If only pressed once 402, it will signal the radio on the public network 409 to wake and transmit its coordinates. If pressed twice 403, it will "listen for the ID of any Zigbee device in range 404. When detected it will put this ID in is non-volatile memory 405, and use these ID's as its identifier of the companion transceiver(s). Once the ID's have been loaded, the Zigbee unit will check for the presence of these IDs in the area 406. If out of range, the Zigbee unit will wake the radio on the public network 409 and it will perform its aforementioned functions. The firmware will then test the battery for enough power to continue operations 407. If low, it will transmit a power low message 409, and flash an external LED to indicate to the caregiver the battery needs to be recharged. Finally, if the companion unit is in range and the wait period has expired, the unit will "sleep" until a preset timer wakes the device again, and it resumes its firmware execution from the beginning.

Figure 8:
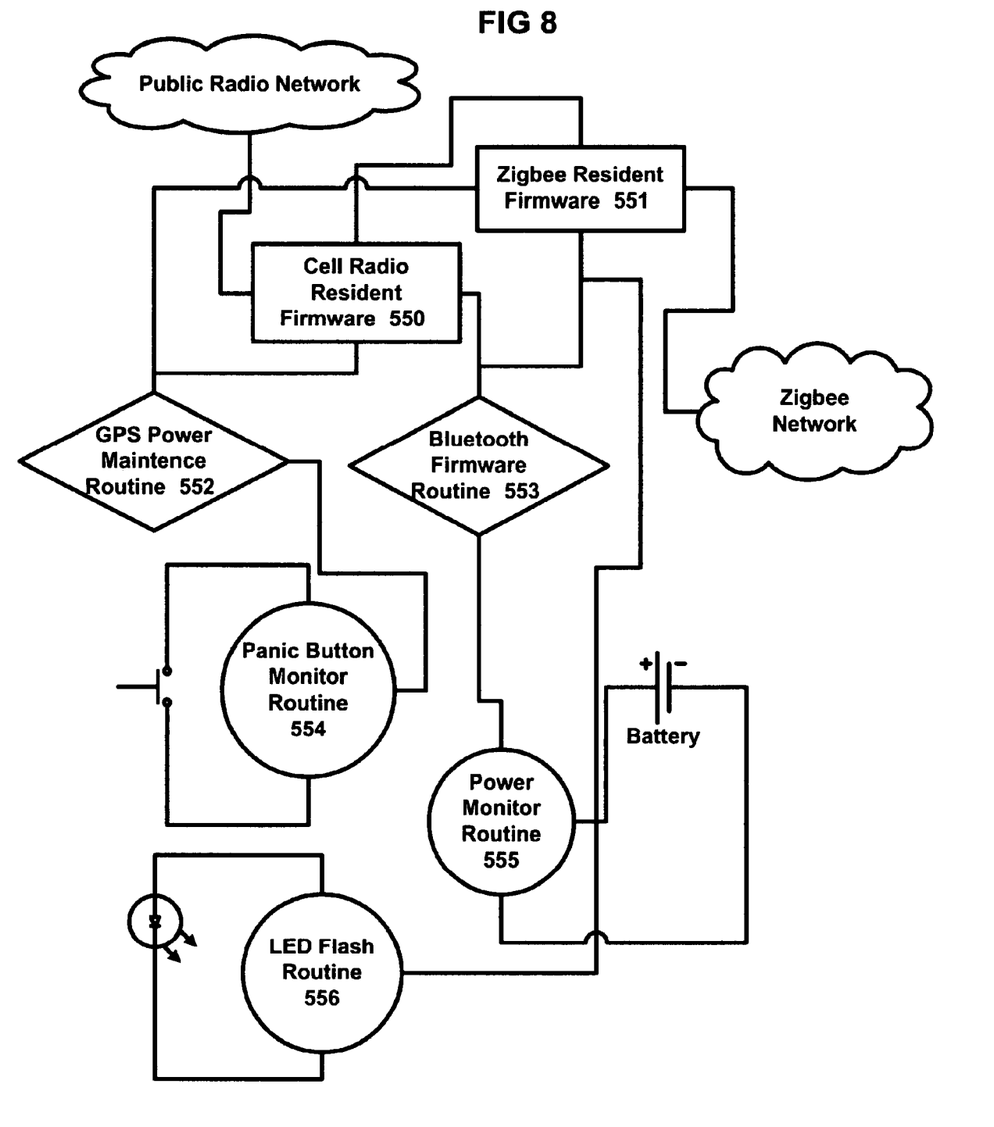
FIG. 8 is a diagrammatic figure showing a tracking system which uses firmware to transfer location data from the GPS receiver, and telemetry from the BlueTooth module, and uses an algorithm to move this data over the local RFID (Zigbee) network, or via terrestrial radio.

FIG. 8 shows a tracking system which uses firmware to transfer location data from the GPS receiver 552, and telemetry from the BlueTooth 553 module, and uses an algorithm to move this data over the local RFID (Zigbee) network 551, or via terrestrial radio 550. To maintain battery power over a long period of time, a combination of various hardware power switches, power monitoring circuitry and proprietary firmware switches power to the terrestrial radio, Bluetooth module, RFID and GPS receiver to reduce overall power consumption. Other components of the firmware controls battery power consumption and monitoring 555, operation of a "panic" button 554 and operation of an external LED 556. The algorithm utilized to move the data is summarized in the flow chart of FIG. 9.

It is to be understood that while certain forms of the present invention have been illustrated and described herein, the present invention is not to be limited to the specific forms or arrangements of parts described and shown.

We claim:

1. A tracking system process for locating a monitored individual comprising the steps of:
   a) affixing a wearable electronic first tag to the individual, said first tag including a wireless transceiver for communication over a public communications network, a GPS receiver for receiving location related information from a global positioning system, a microprocessor for performing on board calculations and transferring data from said GPS receiver to said transceiver, and firmware in said microprocessor for processing instructions for operation of said transceiver, said GPS receiver and said microprocessor communicating with the communications network, wherein an additional Bluetooth module is incorporated into said first tag that communicates to other commercially available Bluetooth devices using the industry standard Bluetooth standard protocol and wherein an additional internal transmitter and receiver are incorporated into each of said first tag and a second tag associated with a caregiver which works in concert with said first tag, said transmitter and receiver using an industry standard RFID Zigbee protocol module with incorporated microprocessor;
   b) delivering an electronic signal from a remote location via a global positioning system to said transceiver on the individual to activate said first tag to receive location related information from the global positioning system and to transmit using the wireless transceiver a location signal directly from said GPS receiver indicative of the location of the said individual to said remote location; and
   c) providing a FLASH memory within said electronic tag for tracking the location of the individual over a period of time and delivering corresponding information from said firmware to said remote location to display the path of travel of the individual over time;
   wherein said first tag is suppressed from transmitting its coordinates when in range of the second RFID Zigbee tag, to greatly extend the battery life of the said first tag by placing it in a low power mode, and when said first tag is physically moved out of a predetermined range of the second tag, the first tag switches into a full power mode, and begins transmitting the GPS coordinates of the individual over the public communication network.

2. A tracking system process according to claim 1 which operates in part over a wireless network wherein a custom firmware package is incorporated into the FLASH memory of the said first tag that will gather information from its integral Bluetooth device from other commercial devices that can measure at least one of heart-rate, body temperature, and other remote sensing devices, which information is processed by the said tag and sent via the wireless network.

3. A tracking system process according to claim 1 which uses custom firmware incorporated into FLASH memory provided in a RFID Zigbee module to permits it to interact with other commercial Zigbee devices mounted within a building to allow tracking of individuals at low cost without using a public wireless communications network.

4. A tracking system process according to claim 1 which operates in part over a public wireless network and which utilizes the public Internet for collecting data from at least one of the public wireless network and in-building RFID systems and preserves data collected from the GPS system and by the Bluetooth module by a software system that preserves the data in a database and permits viewing the individual's current location and other vital data via a web-based application that permits caregivers the ability to directly access this data by at least one of the public Internet and via telephone to a human operated call center.

5. A tracking system process according to claim 4 wherein an alert system is incorporated that notifies caregivers of at least one of activation of the said tag and of actionable information from said tag in the form of email, pager messages or SMS message via a cell phone carried by the caregiver.

6. A tracking system process according to claim 4 wherein commands from said software system are issued to the said first tag to cause it to transmit immediately, or to change a frequency of transmission and content of the first tag data.

7. A tracking system process according to claim 1 which operates in part with telemetry from a BlueTooth module and a local RFID (Zigbee) network wherein firmware is used to transfer location data from the GPS receiver, and telemetry from the BlueTooth module, and wherein said tracking process uses an algorithm to move this data over the local RFID (Zigbee) network, or via terrestrial radio.

8. A tracking system process according to claim 7 wherein, to maintain battery power over a long period of time, a combination of various hardware power switches, power monitoring circuitry and firmware switches power to the terrestrial radio, Bluetooth module, RFID and GPS receiver to reduce overall power consumption.

9. A tracking system process according to claim 7 wherein firmware provides the ability to track the first tag within a building using only the RFID Zigbee network.

10. A tracking system according to claim 1 wherein said individual is human.

11. A tracking system according to claim 10 wherein said individual is human suffering with Alzheimer's syndrome or other illness impairing their ability to seek help on their own.

12. A tracking system according to claim 1 wherein said individual is an animal.

13. A tracking system according to claim 1 wherein said individual is an inanimate object.

* * * * *